(12) United States Patent
Kim

(10) Patent No.: US 6,262,785 B1
(45) Date of Patent: Jul. 17, 2001

(54) PORTABLE DISPLAY DEVICE HAVING AN EXPANDABLE SCREEN

(75) Inventor: Si-han Kim, Seoul (KR)

(73) Assignee: Samsung Display Devices Co., LTD, Kyungki-do (KR)

( * ) Notice: Subject to any disclaimer, the term of this patent is extended or adjusted under 35 U.S.C. 154(b) by 0 days.

(21) Appl. No.: 09/163,814

(22) Filed: Sep. 30, 1998

(30) Foreign Application Priority Data

Oct. 1, 1997 (KR) .................................................. 97-27489

(51) Int. Cl.[7] .................................................. G02F 1/1333
(52) U.S. Cl. .................. 349/58; 345/1; 345/903; 345/905; 361/681; 349/73
(58) Field of Search ................. 345/1, 901, 903, 345/905; 349/58, 73; 361/681

(56) References Cited

U.S. PATENT DOCUMENTS

| | | | |
|---|---|---|---|
| 5,128,662 | * 7/1992 | Failla | 345/1 |
| 5,734,513 | 3/1998 | Wang et al. | 359/742 |
| 5,768,096 | * 6/1998 | Williams et al. | 361/681 |
| 5,847,698 | * 12/1998 | Reavy et al. | 345/173 |
| 6,001,545 | * 1/2000 | Henderson et al. | 345/173 |
| 6,067,078 | * 5/2000 | Hartman | 345/168 |
| 6,085,204 | * 7/2000 | Chijiwa et al. | 707/529 |
| 6,088,220 | * 7/2000 | Katz | 361/680 |
| 6,144,358 | * 11/2000 | Narayanaswamy et al. | 345/102 |

FOREIGN PATENT DOCUMENTS 5-61423 * 3/1993 (JP).

OTHER PUBLICATIONS

Schlam et al, "High Resolution displays and Projection Systems", SPIE vol. 1664, pp. 230–240, Feb. 1992.*

* cited by examiner

Primary Examiner—Kenneth Parker
(74) Attorney, Agent, or Firm—Christie, Parker & Hale, LLP

(57) ABSTRACT

Disclosed is a portable display device including a main body, an extension portion connected to the main body such that the extension portion can be folded over and spread apart from the same, means for inputting data in the main body, and display means, provided in both the main body and the extension portion, for displaying input data and data output from the main body, at the least of the display means able to move toward the other display means to contact the same.

31 Claims, 14 Drawing Sheets

PORTABLE DISPLAY DEVICE HAVING AN EXPANDABLE SCREEN

BACKGROUND OF THE INVENTION

1. Field of the Invention

The present invention relates to a portable display device, and more particularly, to a portable display device having an expandable screen.

2. Description of the Related Art

Display devices are generally used to display information output from a computer in the form of letters, drawings, etc. The development of LSI (large scale integration) circuits, high-capacity batteries, LCDs (liquid crystal displays), electroluminescence elements, etc. have enabled ongoing reductions in the size of display devices, in addition to their use in more sophisticated applications. As a result, the display device is now employed in a wide variety of new technologies including palmtop computers and electronic notepads.

However, in many applications, the display device is excessively small, to correspond with the decreased size of the electronic apparatus to which it is employed, making it difficult for the user to discern the displayed information.

SUMMARY OF THE INVENTION

The present invention has been made in an effort to solve the above problems.

It is an object of the present invention to provide a portable display device having a screen which can be expanded, thereby enabling users to clearly view contents displayed thereon while maintaining the portability of the display device.

To achieve the above object, the present invention provides a portable display device including a main body, an extension portion connected to the main body such that the extension portion can be folded over and spread apart from the same, means for inputting data in the main body, and display means, provided in both the main body and the extension portion, for displaying input data and data output from the main body, at least one of the display means able to move toward the other display means to contact the same.

In another aspect, the portable display device includes a keyboard frame, a first display portion hingedly connected to the keyboard frame through a hinge member, a second display portion hingedly connected to the first display portion, input means for inputting data into the keyboard frame, and display means provided in each the first display portion and the second display portion, for displaying information input through the input means and output of the keyboard frame, at the least of the display means able to move toward the other display means to contact the same.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

Preferred embodiments of the present invention will now be described in detail with reference to the accompanying drawings.

Figure 1:
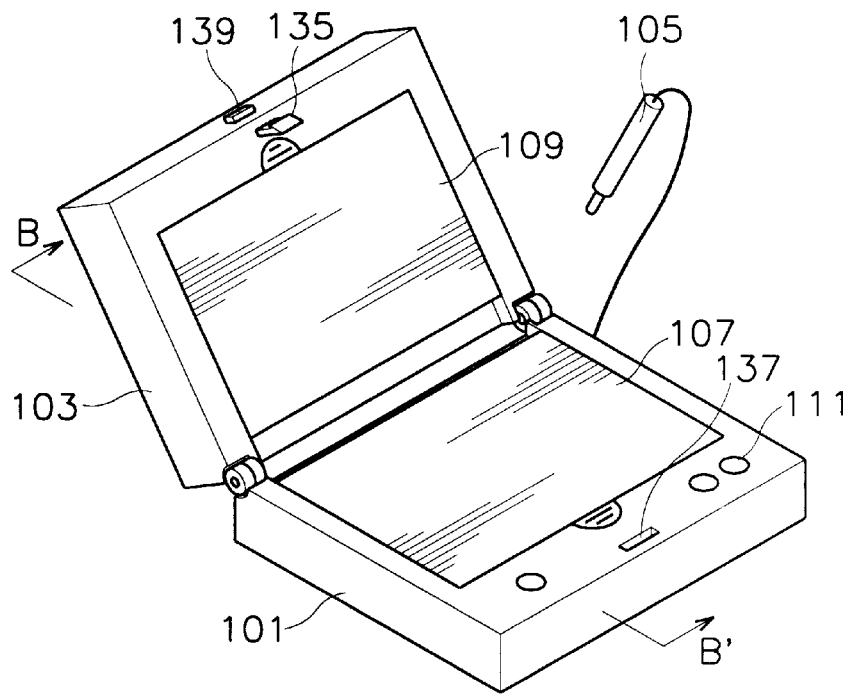
FIG. 1 is a perspective view of a portable display device according to a first preferred embodiment of the present invention.
Figure 2:
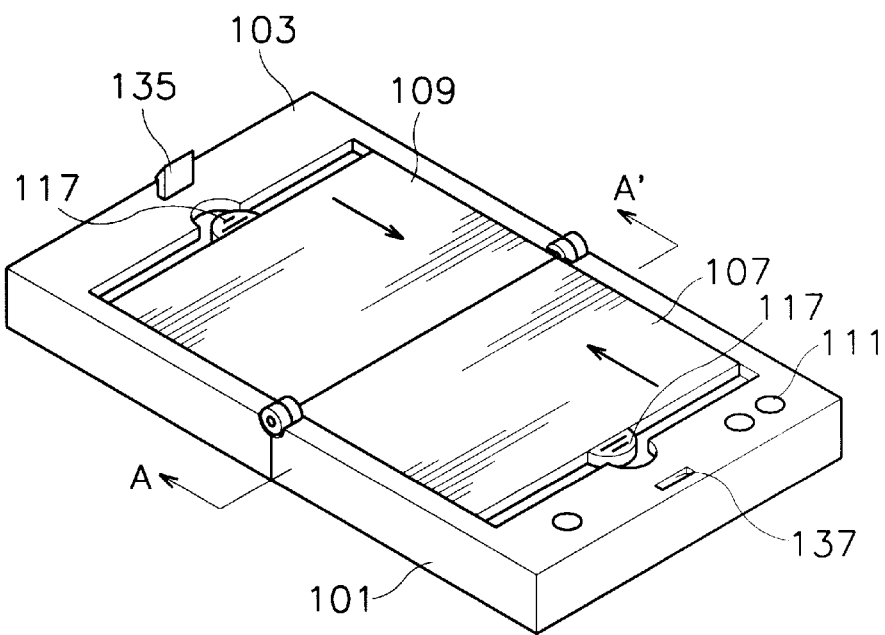
FIG. 2 is a perspective view of the portable display device shown in FIG. 1 in a fully-expanded state.

FIG. 1 shows a perspective view of a portable display device according to a first preferred embodiment of the present invention, and FIG. 2 shows a perspective view of the portable display device shown in FIG. 1 in a fully-expanded state. As shown in the drawings, the portable display device according to the first preferred embodiment of the present invention comprises a main body 101, an extension portion 103 substantially corresponding to the size of the main body 101 and hingedly connected to the same, a first LCD section 107 provided in the main body 101, a second LCD section 109 provided in the extension portion 103, and a light pen 105 connected to the main body 101. The extension portion 103 can be fully expanded so that the same is substantially on the same plane with the main body 101, or folded completely over the main body 101 to make the display device more portable. Although not appearing in the drawings, the first and second LCD sections 107 and 109 are interconnected via a flexible signal line.

A plurality of function buttons 111 is provided in the main body 101. The function buttons 111, one of which is a power button, are manipulated by the user to perform specific control, calculation, and storage functions of the portable display device. If the extension portion 103 is folded completely over the main body 101, the function buttons 111, in addition to the first and second LCD sections 107 and 109, are fully covered and thereby protected.

In addition, means are provided for securely maintaining the extension portion 103 in a state folded over the main body 101. Namely, a locking hook 135 is formed on a distal end of the extension portion 103, on a side of the same contacting the main body 101 when fully folded over the main body 101, and a locking hook button 139 is provided in proximity to the locking hook 135, the locking hook button 139 controlling the locking hook 135. Also, a catch groove 137 is formed in the main body 101 at a position corresponding to the locking hook 135 when the extension portion 103 is fully folded over the main body 101. The locking hook 135 is firmly held in the catch groove 137 until the locking hook button 139 is depressed by the user, thereby releasing the locking hook 135 from the catch groove 137.

The first and second LCD sections 107 and 109 perform the actual display of processes, and results of these processes, undertaken using the light pen 105. During display, the extension portion 103 is fully spread open from the main body 101. At this time, a gap exists between the first and second LCD sections 107 and 109. Although this poses no problem if two different images are displayed, if a single image is displayed, to fully utilize the ability of the present invention to enlarge screen size, the image appearing on the first and second LCD sections 107 and 109 is broken where the gap exists between the same. To remedy this, it is necessary that the first and second LCD sections 107 and 109 are made to be adjacent.

Figure 3:
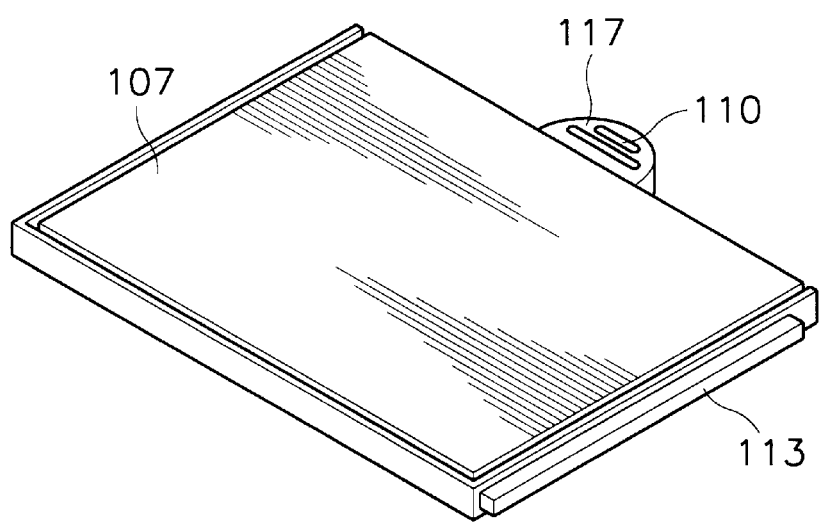
FIG. 3 is a perspective view of a first LCD section shown in FIG. 1.
Figure 4:
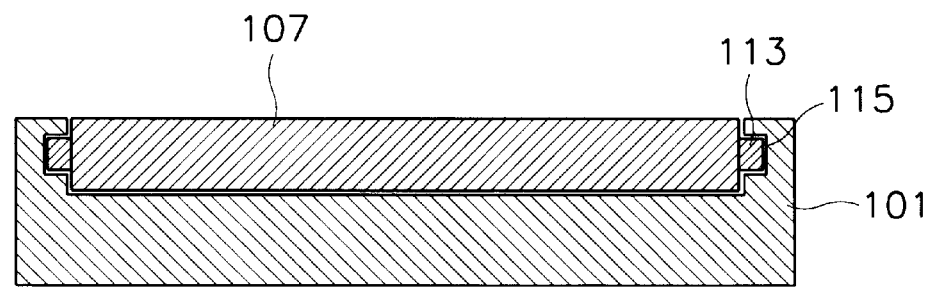
FIG. 4 is a sectional view taken along line A–A' of FIG. 2.
Figure 5:
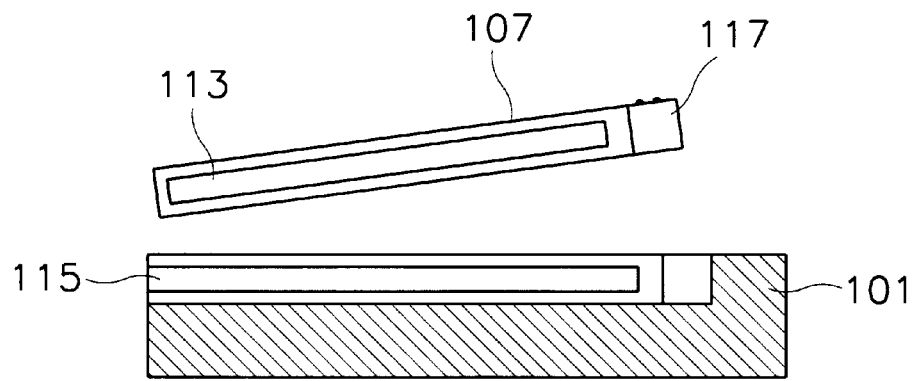
FIG. 5 is a sectional view taken along line B–B' of FIG. 1.

Referring to FIGS. 3 to 5, shown respectively are a perspective view of the first LCD section 107 shown in FIG. 1, a sectional view taken along line A–A' of FIG. 2, and a sectional view taken along line B–B' of FIG. 1. In the drawings, the first LCD section 107 is slidably mounted in the main body 101. To enable this, sliding bars 113 are longitudinally formed along sides of the first LCD section 107, and slide grooves 115 are formed in the main body 101 into which the sliding bars 113 are inserted. The sliding bars 113 of the first LCD section 107 are fitted into the slide grooves 115 of the main body 101 such that the first LCD section 107 is able to slide in a longitudinal direction of the main body 101, while not becoming detached from the same. The same structure is provided between the second LCD section 109 and the extension portion 103 so that the second LCD section 109 is also able to move in a longitudinal direction within the extension portion 103.

Also formed on the first LCD section 107 is a slide grip 117, which is manipulated by the user to control the sliding of the first LCD section 107. A slide grip 117 is also provided on the second LCD section 109 (see FIG. 2). A plurality of grooves 110 are formed on the slide grip 117 in a direction perpendicular to the sliding movement of the first LCD section 107. The grooves 110 prevent the users' fingers from slipping on the slide grip 117.

Figure 6:
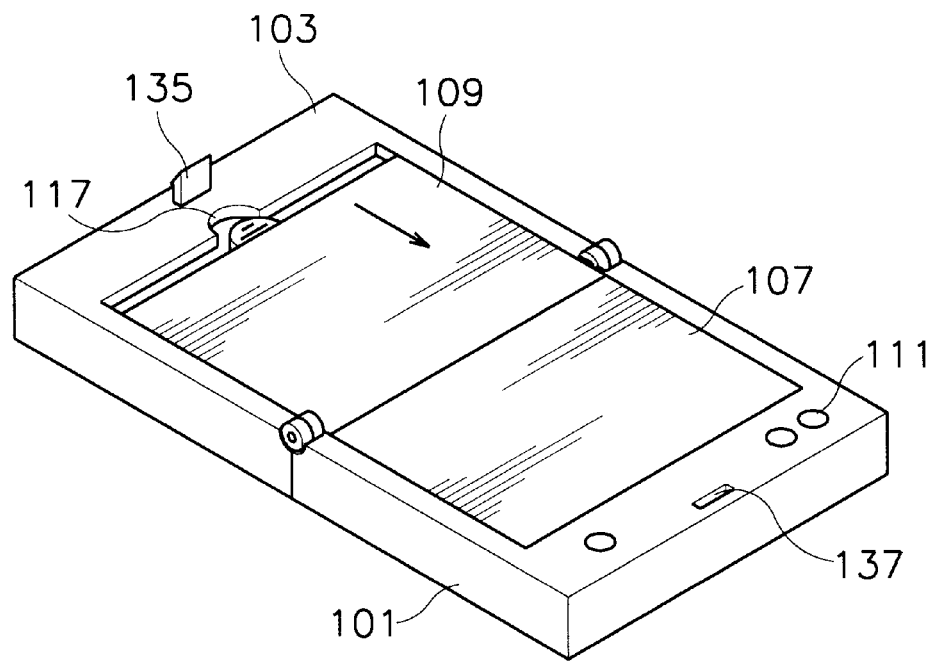
FIG. 6 is a perspective view of a modified example of the display device according to the first preferred embodiment of the present invention.

Referring now to FIG. 6, shown is a perspective view of a first modified example of the display device according to the first preferred embodiment of the present invention. In the display device shown in FIG. 6, only the second LCD section 109 provided in the extension portion 103 is able to slide therein, while the first LCD section 107 is fixedly mounted in the main body 101. However, the slide grooves 115, in addition to being formed in the extension portion 103 as in the above, are expanded partially into the main body 101 at a predetermined distance therein. Accordingly, the second LCD section 109 is able to slide to be partly positioned in the main body 101 such that the second LCD section 109 is flush against the first LCD section 107. In the first modified example of the first embodiment, no slide grip 117 is formed on the first LCD section 107.

In the above first modified example, although the second LCD section 109 is slidably provided in the extension 103 while the first LCD section 107 is fixedly mounted in the main body 101, it is also possible to have the opposite structure. That is, it is possible for the first LCD section 107 to be slidably provided in the main body 101 and the second LCD section 109 to be fixedly joined to the extension portion 103.

Figure 7:
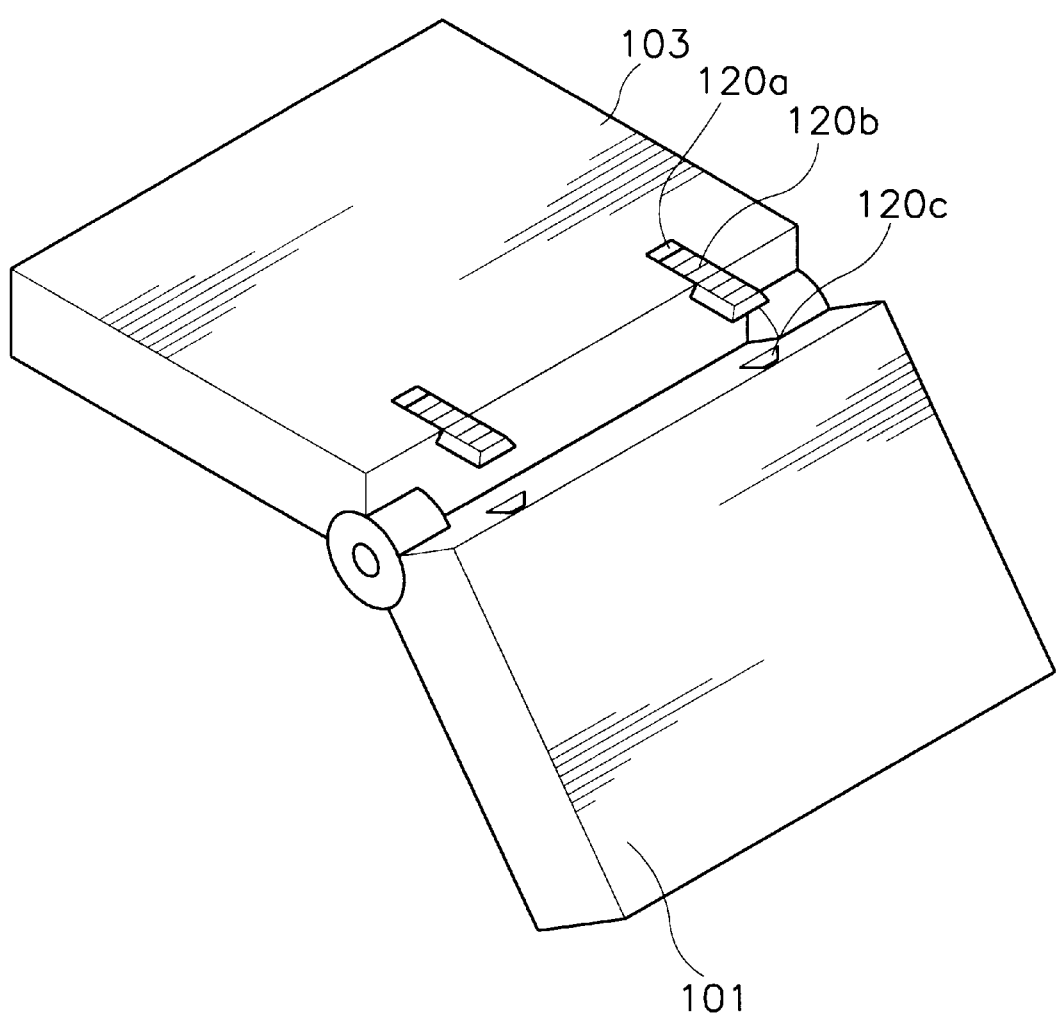
FIG. 7 is a rear perspective view of the portable display device shown in FIG. 1.

FIG. 7 shows a rear perspective view of the portable display device shown in FIG. 1. The structure shown in FIG. 7 also applies to the first modified example of the first embodiment. As shown in the drawing, slide tabs 120b are slidably provided in slots 120a formed on a rear of the extension portion 103. Formed in the main body 101 and corresponding to a position of the slide tabs 120b, when the extension portion 103 and the main body 101 are fully open to be substantially planar, are catch grooves 120c.

When expanding the display device by completely spreading open the main body 101 and the extension portion 103, the slide tabs 120b are pushed into the catch grooves 120c by the user such that the main body 101 and the extension portion 103 are securely maintained in their open state and the same do not inadvertently fold. However, when wanting to fold the display device, the user applies force to the slide tabs 120b in a direction away from the main body 101, such that the slide tabs 120b slide in the slots 120a and are disengaged from the catch grooves 120c, thereby enabling the folding of the extension portion 103 over the main body 101.

A structure which prevents the display of images from appearing separated as a result of the formation of a seam between the first and second LCD sections 107 and 109, when the same are slid together using the structure of the first embodiment or the first modified example described above, will be described hereinafter.

Figure 8A:
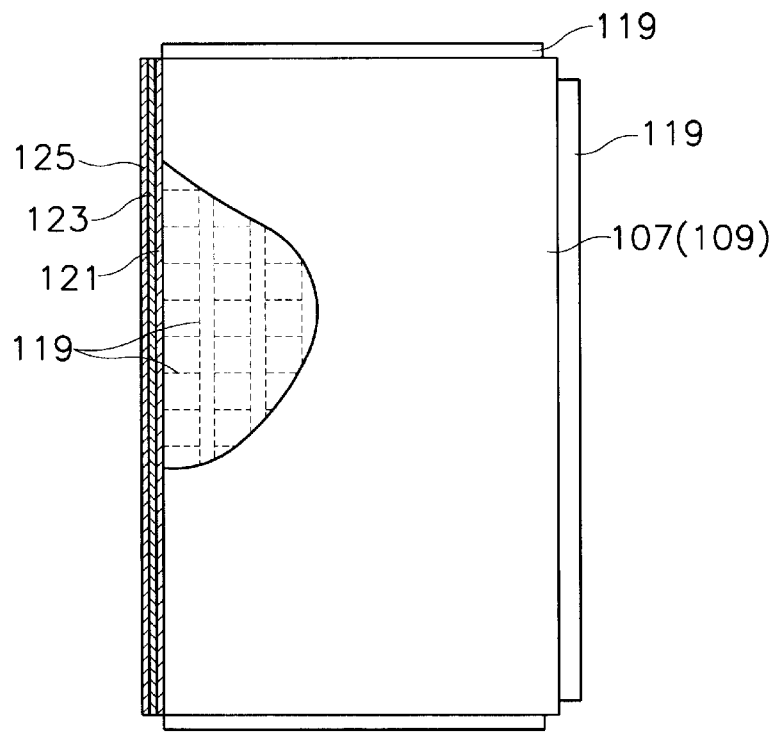
FIG. 8a is a plan view of the first LCD section shown in FIG. 1, and an expanded plan view of a joining face portion of the same.
Figure 8B:
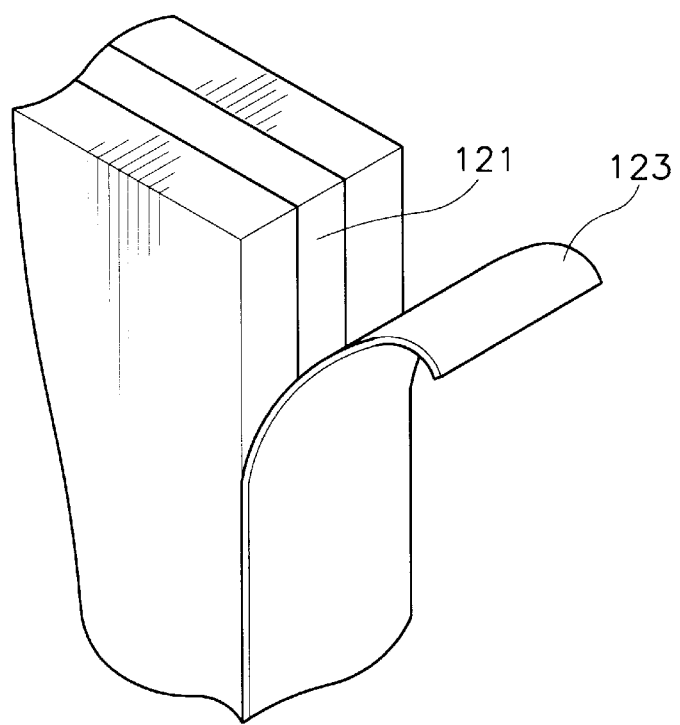
FIG. 8b is a perspective view of a corner portion of the joining face of the first LCD section shown in FIG. 1.
Figure 8C:
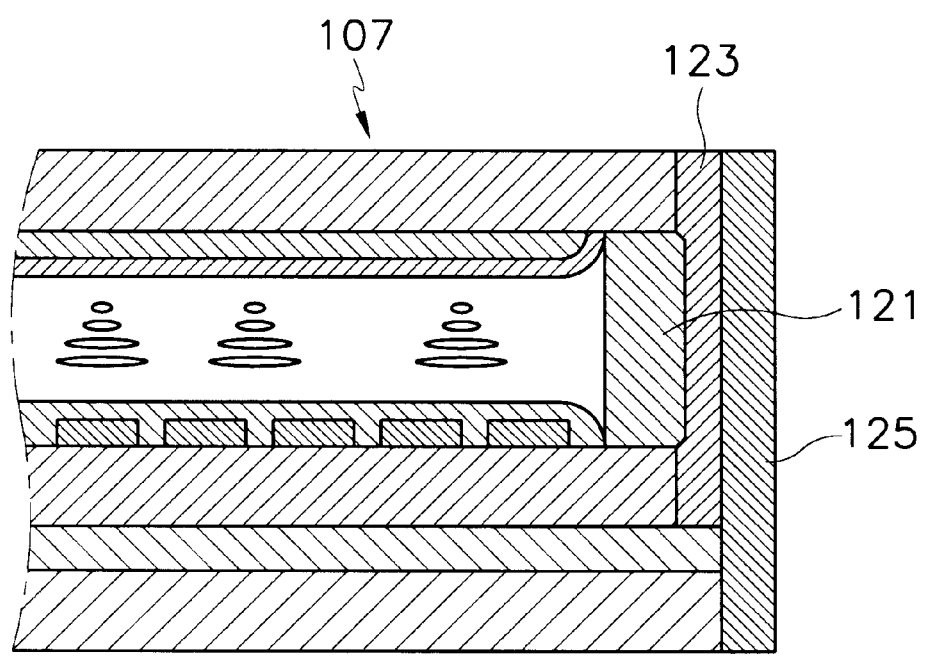
FIG. 8c is a side sectional view of the joining face of the first LCD section shown in FIG. 1.

FIG. 8a shows a plan view of the first LCD 107 section shown in FIG. 1, and an expanded plan view of a joining face portion of the same; FIG. 8b shows a perspective view of a corner portion of the joining face of the first LCD section 107 shown in FIG. 1; and FIG. 8c shows a side sectional view of the joining face of the first LCD section 107 shown in FIG. 1. As shown in the drawings, a transparent electrode 119, which drives the first LCD section 107, is coated to prevent protrusion of the same from the joining face of the first LCD section 107. Further, a side wall 121 is provided between two substrates of the first LCD section 107 to seal liquid crystal material injected therebetween, a width of the side wall 121 being 0.3 mm or less. The second LCD section 109 is formed identically as the first LCD section 107. With this structure of the joining faces of the first and second LCD sections 107 and 109, the seam formed therebetween is minimized so that the image displayed on the first and second LCD sections 107 and 109 appears as a single, unbroken image.

In the above, although conventional sealant is typically used for the side wall 121, it is also possible to use a thick-film printing method to form the side wall 121 in order to minimize the seam between the first and second LCD sections 107 and 109. The thick-film printing method, a layer having a width of 100 $\mu$m to 200 $\mu$m can be implemented. Accordingly, the side wall 121 is made thinner than when using a sealant by the utilization of this thick-film printing method. Here, it is possible to use the thick-film printing method for only the joining faces of the first and second LCD sections 107 and 109, or between the two substrates along all the faces of the same.

To prevent wear to the side walls 121 caused by the repeated abutting of the joining faces of the first and second LCD sections 107 and 109, which can lead to liquid crystal leakage, a resin film 123 is provided on the joining faces of the first and second LCD sections 107 and 109 covering the side walls 121 of the same. The resin film 123 also acts an insulator between the first and second LCD sections 107 and 109, and is tinted to minimize the dispersion of light such that the portion of the image at the seam between the first and second LCD sections 107 and 109 is improved. It is possible for the film 123 to be of a metal plate having these same qualities. To minimize the seam between the first and second LCD sections 107 and 109, it is preferable that the resin film 123 has a thickness of 0.1 mm or less.

In addition, to further strengthen the joining faces of the first and second LCD sections 107 and 109, a reinforcing layer 125 is provided over the resin film 123. The reinforcing layer 125 is a metallic material, preferably having a thickness of 0.2 mm or less to minimize the seam between the first and second LCD sections 107 and 109.

When the joining faces of the first and second LCD sections 107 and 109 are abutted using the method of the first embodiment or the first modified example thereof, the width between the LCD sections 107 and 109 is 1.2 mm or less. A thickness of 1.5 mm or less is sufficient to make the image displayed on the first and second LCD sections 107 and 109 appear as a single image.

Figure 9:
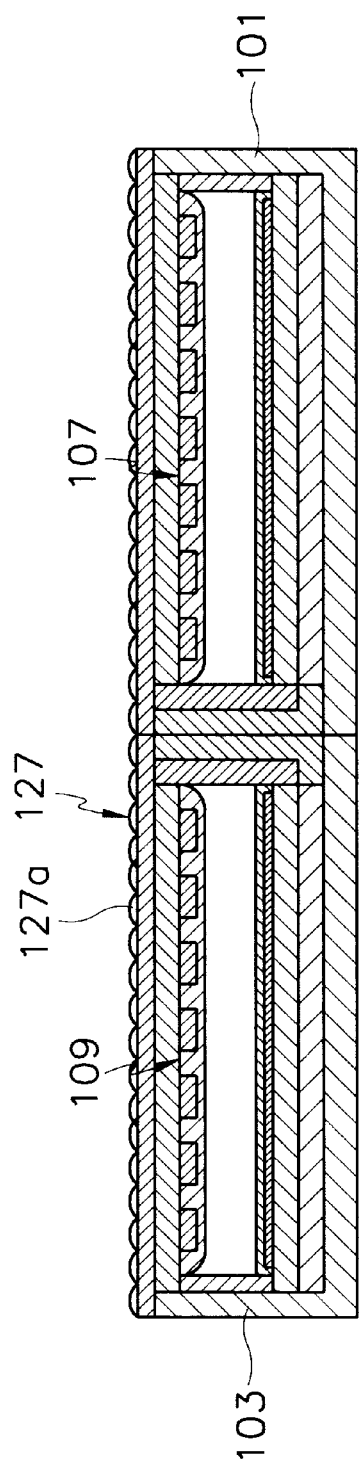
FIGS. 9 and 10 are cross-sectional views of the display device shown in FIG. 1 in a fully-expanded state used to describe the use of an optical film so that a seam between the first LCD section and a second LCD section is not visible to the user.
Figure 10:
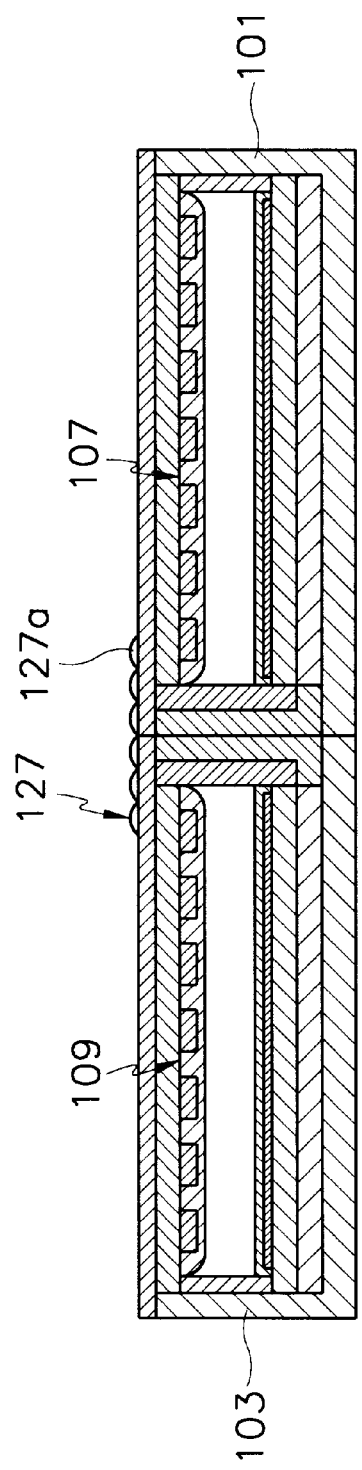

FIG. 9 illustrates a cross-sectional view of the display device shown in FIG. 1 in a fully-expanded state. As shown in the drawings, an optical film 127 is provided on an outside surface of the first and second LCD sections 107 and 109. The optical film 127 fully flattens when the extension portion 103 is spread apart from the main body 101 to be substantially planar with the same. The optical film 127 is realized through the combination of a plurality of micro convex lenses 127a, and functions to enlarge the image pattern displayed on the first and second LCD sections 107 and 109 so that the seam between the same is not visible to the user.

The optical film 127 can be disposed over both the first and second LCD sections 107 and 109, as shown in FIG. 9, or can be formed only around the area of the seam between the first and second LCD sections 107 and 109. Here, it is preferable that the optical film 127 has an focal distance corresponding to the thickness of the first and second LCD sections 107 and 109.

Figure 11:
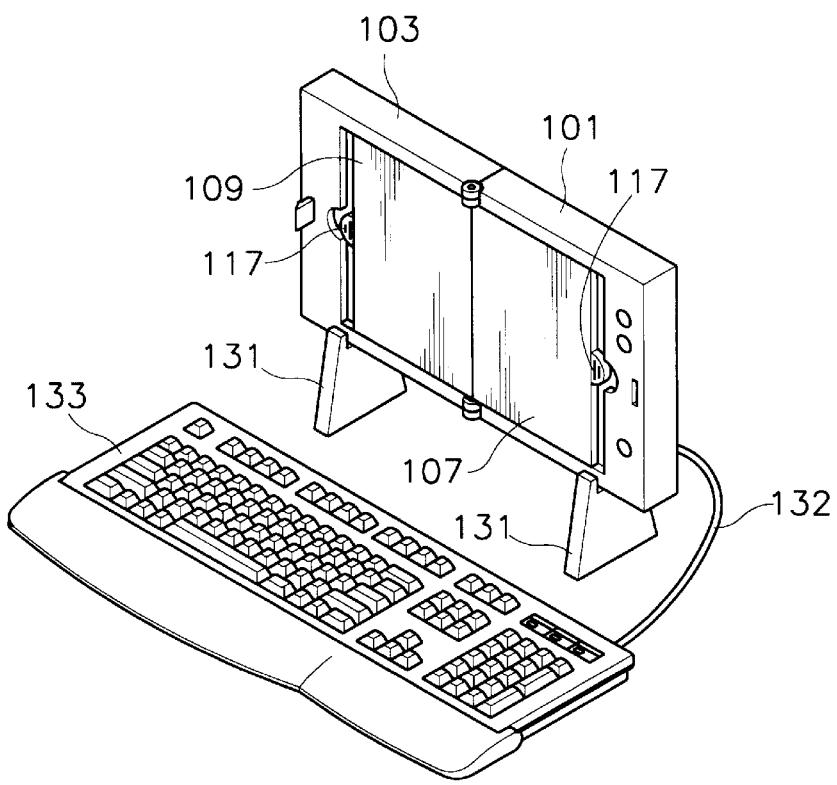
FIG. 11 is a perspective view of the portable display device shown in FIG. 1 in an upright state and connected to a keyboard.

FIG. 11 shows a perspective view of the portable display device shown in FIG. 1 in an upright state and connected to a keyboard. As shown in the drawing, one of the longitudinal sides of the display device is provided on supports 131, and a keyboard 133 is connected to the display device through a wire 132. A port (not shown) is provided in the display device into which an end of the wire 132 of the keyboard 133 is inserted.

Figure 12:
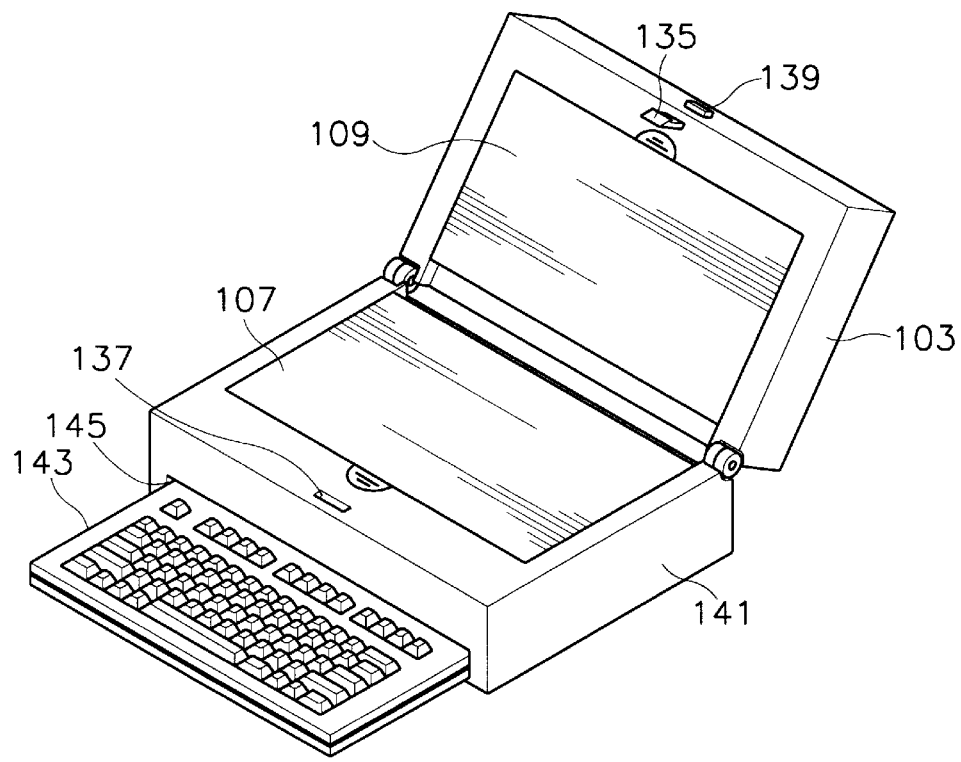
FIG. 12 is a perspective view of a second modified example of the display device according to the first preferred embodiment of the present invention.

FIG. 12 shows a perspective view of a second modified example of the display device according to the first preferred embodiment of the present invention. As shown in the drawing, a cavity 145 is provided in a main body 141 of the portable display device. A keyboard 143 is slidably provided in the cavity 145 of the main body 141 such that the keyboard 143 can be positioned therein when transporting the display device, or extended therefrom when using the display device.

Figure 13:
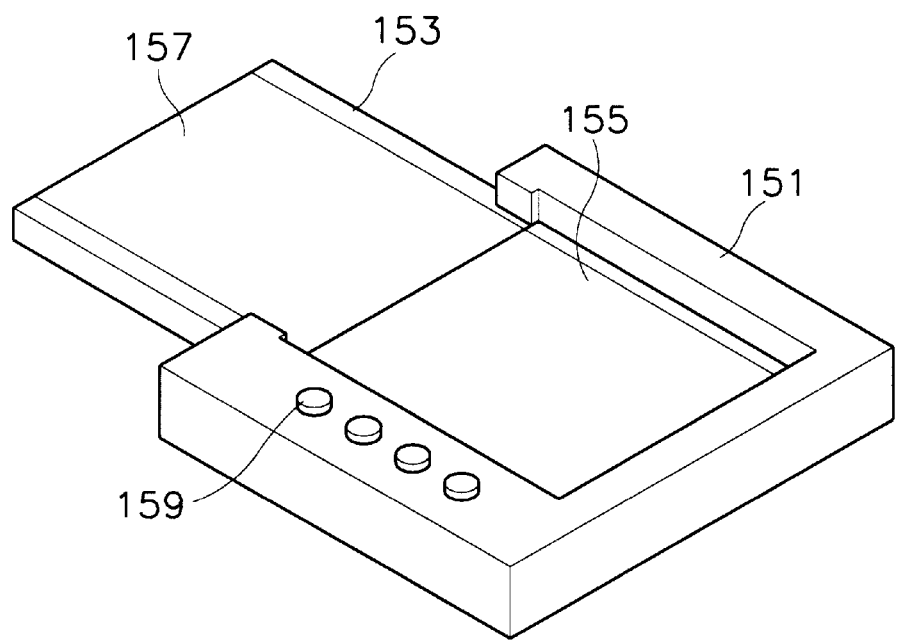
FIGS. 13 and 14 are perspective views of a display device according to a second preferred embodiment of the present invention.
Figure 14:
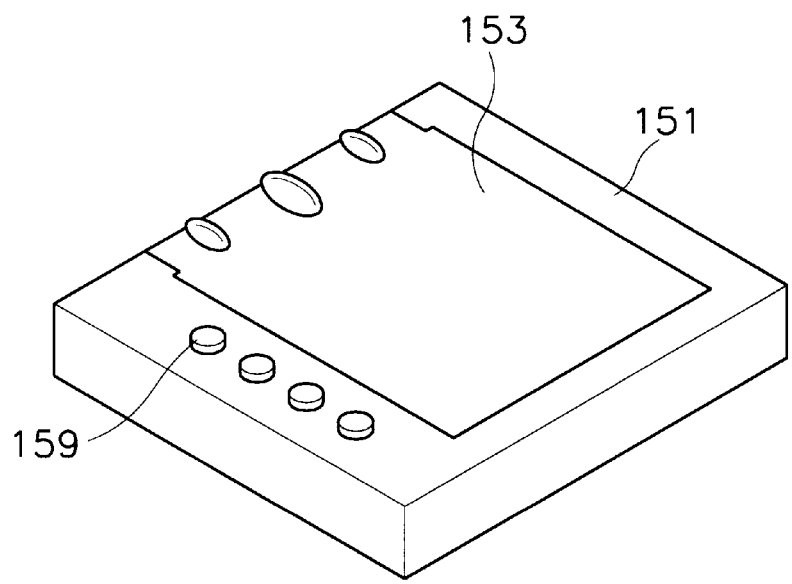

Referring now to FIGS. 13 and 14, shown are perspective views of a display device according to a second preferred embodiment of the present invention. As shown in the drawings, the portable display device according to the second preferred embodiment of the present invention comprises a frame 151, having a plurality of function buttons 159; and a cover 153 hingedly connected to the frame 151. First and second LCDs 155 and 157 are provided respectively in the frame 151 and the cover 153. The first LCD 155 is fixedly mounted in a depressed area of the frame 151 such that when the cover 153 is folded over the frame 151, a rear face of the same is substantially on a same plane with a front face of the frame 151 as shown in FIG. 12.

Figure 15:
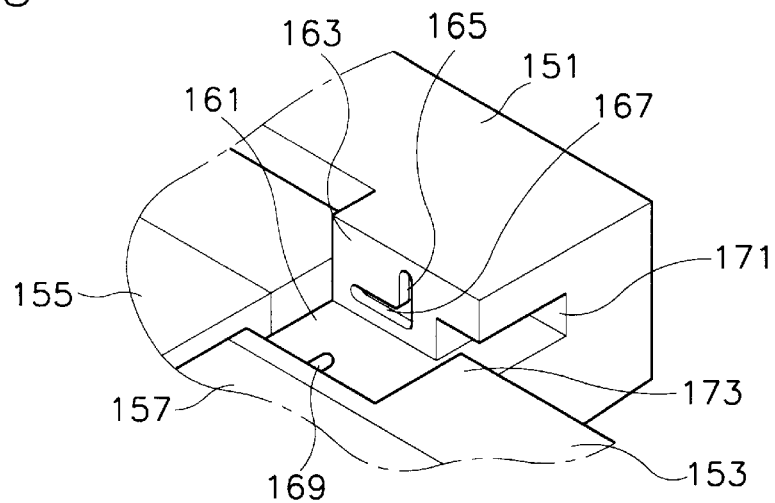
FIG. 15 is a perspective view of a hinge connecting portion of a cover and a frame shown in FIGS. 13 and 14.
Figure 16A:
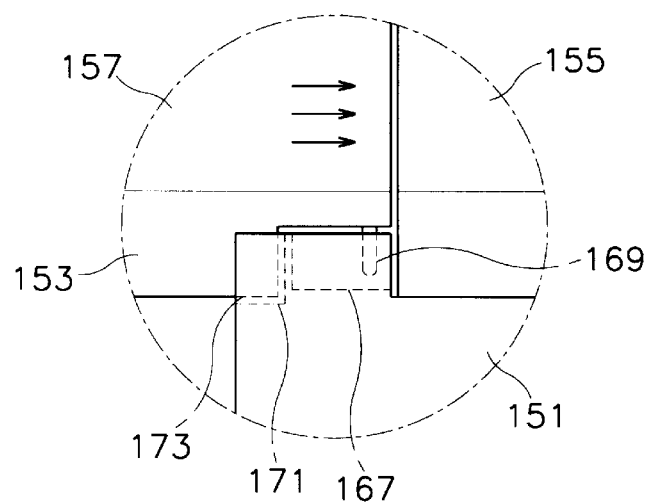
FIGS. 16a and 16b are plan views of the hinge connecting portion of the cover and frame shown in FIGS. 13 and 14 used to describe the sliding motion of the cover.
Figure 16B:
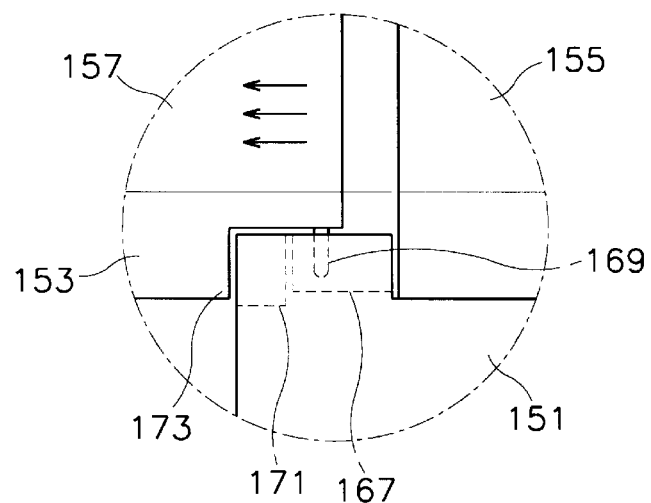

FIG. 15 shows a perspective view of a hinge connecting portion of the above cover 153 and frame 151, and FIGS. 16a and 16b are plan views of the hinge connecting portion used to describe the sliding motion of the cover 153.

As shown in FIG. 15, in a state where the cover 153 is fully spread open from the frame 151, the cover 153 contacts a horizontal face 161 of the frame 151 such that the second LCD 157 of the cover 153 is on substantially the same plane as the first LCD 155 of the frame 151. Vertical faces 163 are formed perpendicular to the horizontal face 161 and on opposite sides of the frame 151, the vertical faces 163 corresponding to distal-end corners of the cover 153 when the same is mounted to the frame 151. Each vertical face 163 has a vertical groove 165 and a horizontal groove 167, the vertical groove 165 communicating with the horizontal groove 167 to form an elbow. Also formed in the frame 151, adjacent to the vertical faces 163, are catch slots 171.

Integrally formed on both sides of the cover 153, on a distal end of the same, are positioning rods 169, which extend in a direction toward the vertical faces 163 of the frame 151. The positioning rods 169 are provided in the horizontal grooves 167 when the cover 153 is fully spread open from the frame 151, and in the vertical grooves 165 when the cover 153 is being rotated on the frame 151 and when folded over the same 151. The cover 153 also includes corner portions 173 which are positioned in the catch slots 171 of the frame 151 when the display device is in a state as shown in FIG. 11.

With regard to the opening and closing operation of the display device of the second embodiment, when in a state as shown in FIG. 13, the elements described in FIG. 15 are positioned as shown in FIG. 16a. That is, the cover 153 is pushed toward the frame 151 by the user such that the positioning rods 169 slide along the horizontal grooves 167 of the frame 151, and the corner portions 173 of the cover 153 are positioned in the catch slots 171 of the frame 151. As a result, joining faces of the first and second LCDs 155 and 157 abut, thereby enabling the display of a single, enlarged image. In this state, since the corner portions 173 are positioned in the catch slots 171, the cover 153 is securely maintained in its spread-open position and can not be inadvertently rotated toward the frame 151. Here, the structure of the joining faces of the first and second LCDs 155 and 157 is identical as that described in the display device of the first embodiment.

When wanting to fold the cover 153 onto the frame 151, the user first pulls the cover 153 in a direction away from the frame 151 such that the positioning rods 169 slide along the horizontal grooves 167 toward the vertical grooves 165. In this state, the corner portions 173 of the cover 153 are no longer positioned in the catch slots 171 of the frame 151 as shown in FIG. 16b. The user then rotates the cover 153 over the frame 151 to be positioned thereon in a state as shown in FIG. 14. At this time, the positioning rods 169 of the cover 153 slide up the vertical grooves 165 of the frame 151.

Figure 17:
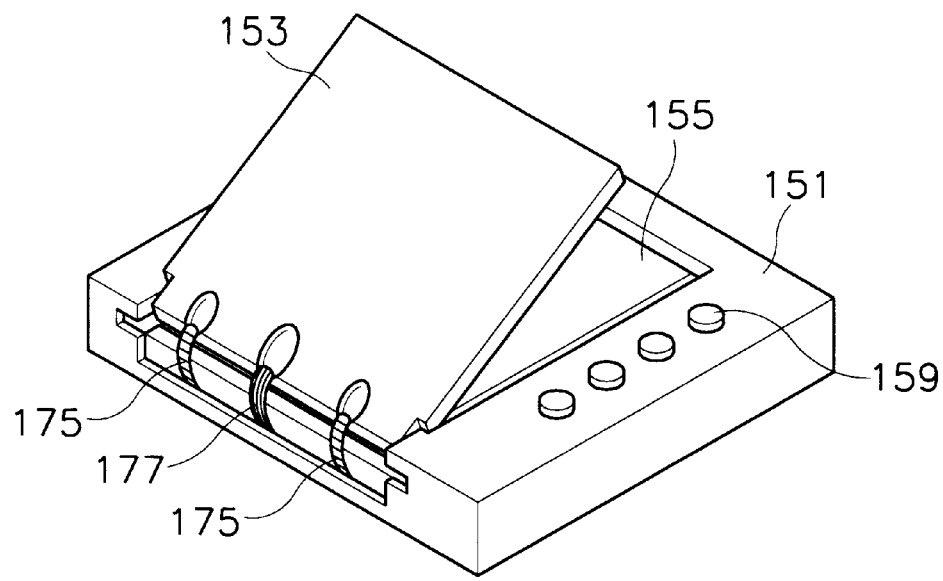
FIG. 17 is a rear perspective view of the display device shown in FIGS. 13 and 14.

FIG. 17 is a rear perspective view of the display device shown in FIGS. 13 and 14. In the drawing, a pair of elastic members 175 interconnect the cover 153 and the frame 151. The elastic members 175 provide elastic force in the direction toward the frame 151 such that when the cover 153 is spread open by the user, the same is pulled toward the cover 153 by this elastic force to be in a state as shown in FIG. 13, where the joining faces of the first and second LCDs 155 and 157 are in close contact. Also connected between the frame 151 and the cover 153 is a signal line 177 which applies predetermined signals to the second LCD 157 of the cover 153. In the above, it is possible to increase the number of elastic members 175 provided between the frame 151 and the cover 153.

Figure 18:
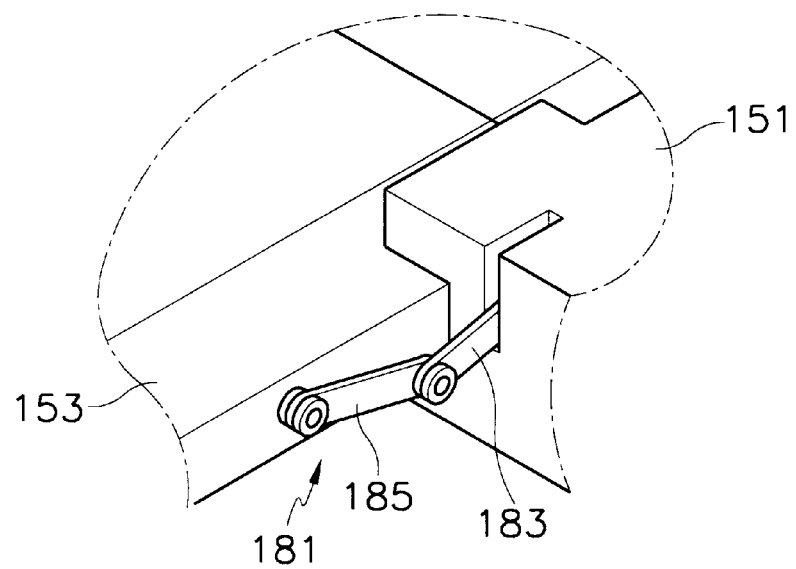
FIG. 18 is a perspective view of a modified example of the display device shown in FIGS. 13 and 14.

FIG. 18 shows a perspective view of a modified example of the display device according to the second preferred embodiment of the present invention. As shown in the drawing, the cover 153 and the frame 151 are connected via a pair of lever assemblies 181. Each lever assembly 181 includes first and second arms 183 and 185, ends of which are pivotally connected to the frame 151 and the cover 153, respectively. Other ends of the first and second arms 183 and 185 are pivotally interconnected. With this structure, the cover 153 is able to be spread open from and folded over the frame 151, as well be slid toward and away from the same.

Figure 19:
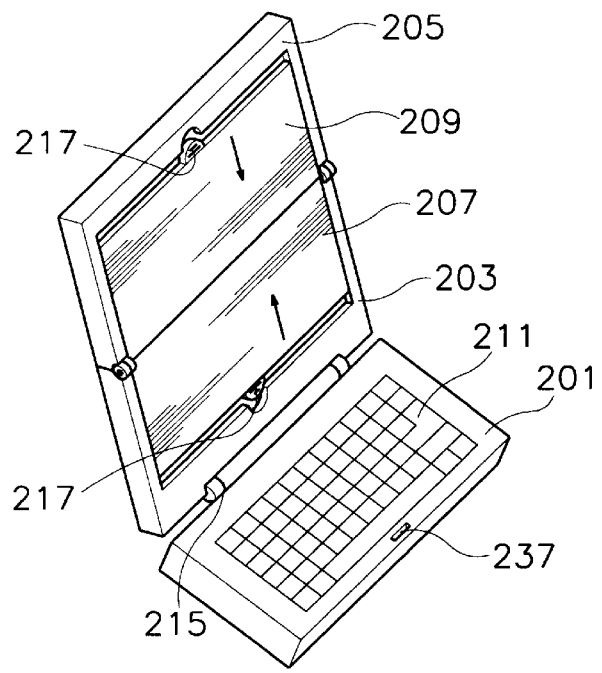
FIG. 19 is a perspective view of a display device according to a third preferred embodiment of the present invention.

Referring to FIG. 19, shown is a perspective view of a display device according to a third preferred embodiment of the present invention. As shown in the drawing, the display device according to the third preferred embodiment comprises a keyboard frame 201 having a keyboard 237, a first display portion 203 hingedly connected to the keyboard frame 201 by a hinge member 215, and a second display portion 205 hingedly connected to the first display portion 203. A first LCD 207 is provided in the first display portion 203 and a second LCD 209 is provided in the second display portion 203. Each the first and second LCDs 207 and 209 has a slide grip 217, and is structured as in the first embodiment. That is, the first and second LCDs 207 and 209 are slidably provided respectively in the first and second display portions 203 and 205, and have joining faces that are structured such that only a minimal seam is formed therebetween when slid to contact one another as shown in the drawing, thereby enabling the display of an image that appears uninterrupted at the seam. Further, a catch groove 237 is formed in the keyboard frame 201, and a locking hook 135 and a locking hook button 139 (both not shown) are provided on a rear, center portion of the second display portion 205.

Figure 20:
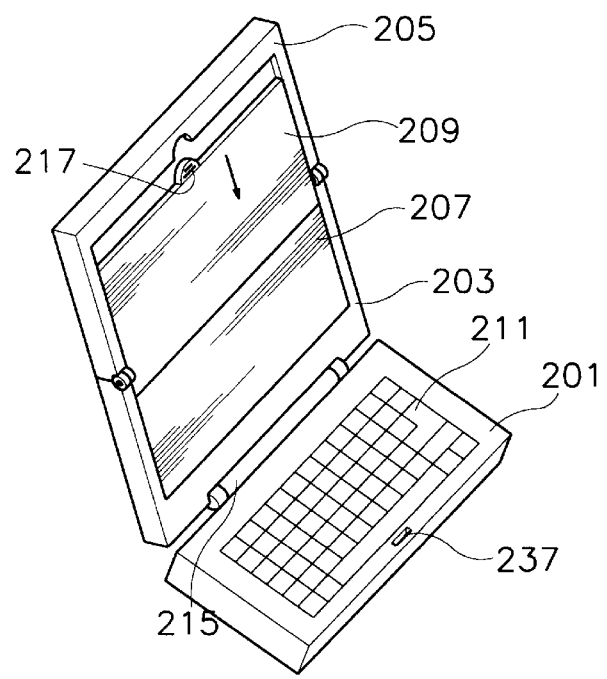
FIG. 20 is a perspective view of a modified example of the display device shown in FIG. 19.

FIG. 20 shows a perspective view of a modified example of the display device according to the third preferred embodiment of the present invention. The of the modified example is identical in structure to the third embodiment, except the first LCD 207 is fixedly mounted in the first display portion 203, while only the second LCD 209 is able to slide within the second display portion 205. With this structure, the second LCD 209 is slid toward the first LCD 207, when the first and second display portions 203 and 205 are spread open, so that a single LCD is formed.

Figure 21:
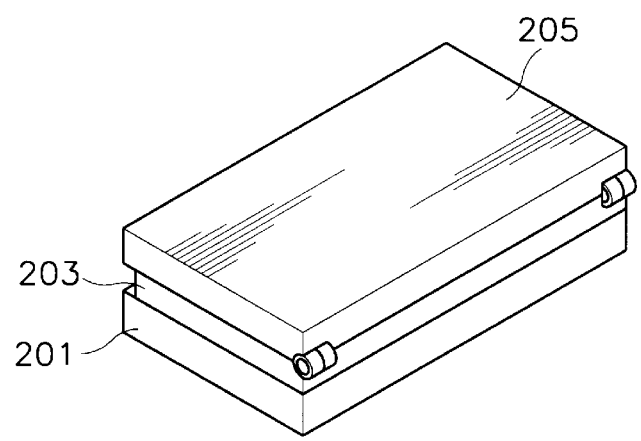
FIG. 21 is a perspective view of the display device shown in FIG. 19 in a folded state.

In the portable display device of the third embodiment and the modified example of the same structured as in the above, with the first and second LCDs 207 and 209 repositioned to their original states (only the first LCD 207 in the modified example), the second display portion 205 can be folded completely over the first display portion 203, then the first and second display portions 203 and 205 can be folded over the keyboard frame 201. Accordingly, the display device results in a compact state as shown in FIG. 21. At this time, with continued pressure applied by the user on the first and second display portions 203 and 205 in a downward direction, the locking hook (not shown) becomes engaged with the catch groove 237 such that the display device is securely maintained in its compact state. This state is released by the user pressing on the locking hook button (not shown) which disengages the locking hook (not shown) from the catch groove 137.

Figure 22:
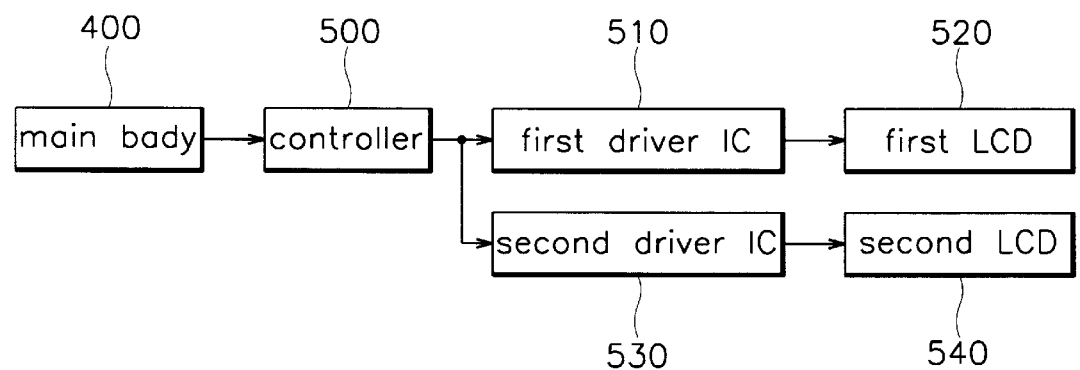
FIG. 22 is a block diagram used to describe the driving of LCDs of the preferred first to third embodiments of the present invention.

FIG. 22 shows a block diagram used to describe the driving of the LCDs of the preferred first to third embodiments of the present invention. With reference to the drawing, signals transmitted from a main body 400 are divided in a controller 500, transmitted to first and second driver ICs 510 and 530, then applied to first and second LCDs 520 and 540 to realize the display of a single image.

Figure 23:
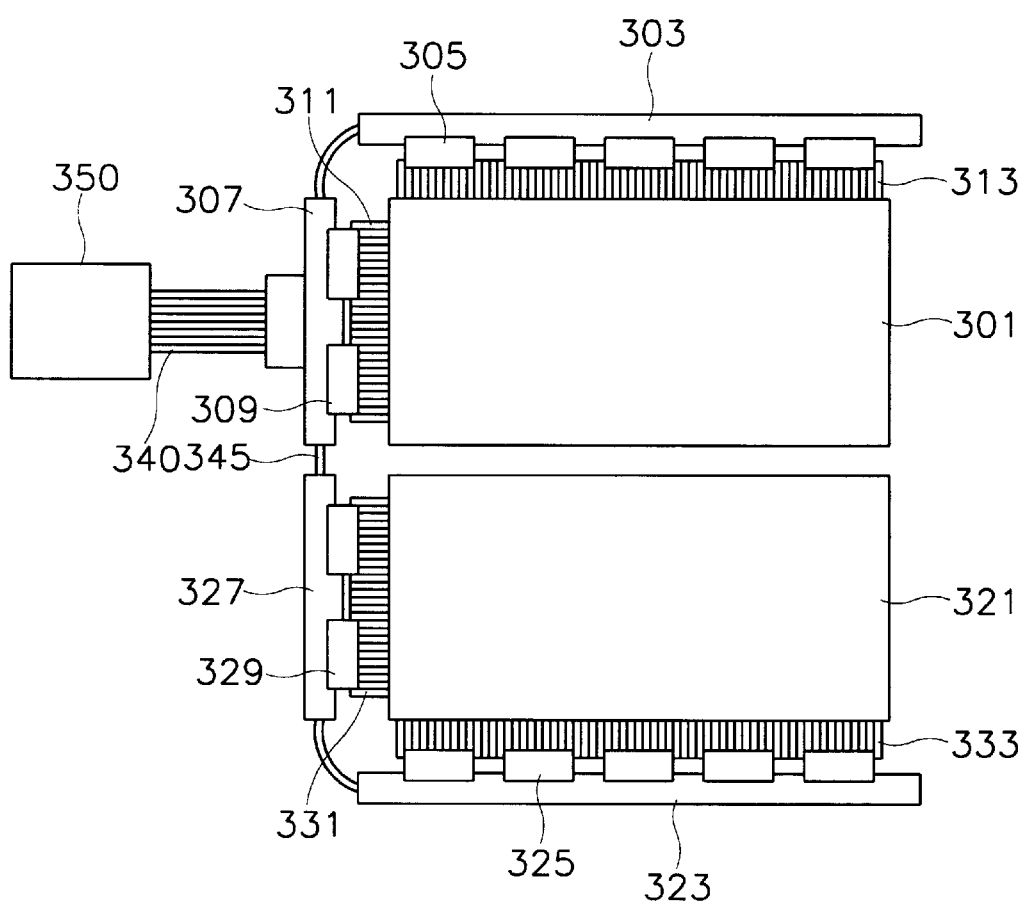
FIG. 23 is a plan view of a portion of the LCDs of the preferred first to third embodiments used to describe a drive system of the same.

FIG. 23 shows a plan view of a portion of the LCDs of the preferred first to third embodiments used to describe a drive system of the same. The drive system enables the display of a single image on first and second liquid crystal panels 301 and 321. Namely, the conventional split matrix method is used to drive the first and second liquid crystal panels 301 and 321, with the division being made at the point where the same are separated.

Accordingly, first and second PCBs 307 and 327 are divided to correspond to the first and second liquid crystal panels 301 and 321, and common driver ICs 309 and 329 are mounted on the first and second PCBs 307 and 327. The common driver ICs 309 and 329 sequentially apply voltage values corresponding to first and second rows of scanning electrodes 311 and 331, respectively. The divided first and second PCBs 307 and 327 are connected through a wire 345 which is flexible to enable the folding and spreading apart of the first and second liquid crystal panels 301 and 321.

A control portion 350 is connected to either the first PCB 307 or the second PCB 327 via a signal supply line 340. The control portion 350 applies scanning signals to the common driver ICs 309 and to segment driver ICs 305 and 325, the segment driver ICs 305 and 325 respectively controlling rows of data electrodes 313 and 333 to ON and OFF states.

The operation of the drive system structured as in the above will be described hereinafter.

The common driver ICs 309 and 329, interacting with the first liquid crystal panel 301 using scanning signals and data signals output from the control portion 350, apply voltage values sequentially to the row of first scanning electrodes 311, and apply ON/OFF voltage to the row of data electrodes 313. As a result, pixels defined by the interacting first scanning electrodes 311 and the data electrodes 313 change an orientation angle of the liquid crystal according to arrangement of the first scanning electrodes, thereby realizing the display of an image.

Simultaneously with the display of an image by the first liquid crystal panel 301, the above operation is repeated for the second liquid crystal panel 321 such that an image is also displayed on the same. Accordingly, the two images are meshed to form a single image. The scanning signals and the data signals are continuously input such that this operation is repeated.

In the portable display device of the present invention structured and operating as in the above, since the screen can be expanded, users are able to clearly view contents displayed thereon while the portability of the display device is maintained.

It is to be noted that although LCDs were used for the display means, the present invention is not limited to this configuration and it is possible to use, for example, EL (Electroluminescence) elements and other such flat panel display elements.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A portable display device comprising:
   a main body having at least one data input key and a display in a common housing; and
   an extension portion having a display, the extension portion connected to the main body such that the extension portion can be folded over or unfolded from the main body;
   wherein at least one of the displays is capable of moving toward and contacting the other display when the extension portion is unfolded.

2. The portable display device of claim 1 wherein the means for inputting data comprises a keyboard.

3. The portable display device of claim 1 wherein each of the displays comprises a liquid crystal display.

4. A portable display device comprising:
   a main body having means for inputting data and output data;
   an extension portion connected to the main body such that the extension portion can be folded over or spread apart from the main body; and
   wherein each of said main body and said extension portion comprises a slidably mounted display for displaying the input data and the data output from the main body, at least one of the displays being capable of moving toward and contacting the other display.

5. The portable display device of claim 4 wherein each of the displays comprises a liquid crystal display.

6. The portable display device of claim 5 wherein each of the liquid crystal displays comprises a slide grip for sliding, by a user, its respective liquid crystal display.

7. The portable display device of claim 5 wherein each of the liquid crystal displays comprises a side wall having a joining face where the liquid crystal display comes into contact with the other liquid crystal display, each of said joining faces having a width of 0.3 mm or less.

8. The portable display device of claim 5 wherein each of the liquid crystal displays comprises a side wall having a joining face where the liquid crystal displays comes into contact with the other liquid crystal display, said portable display further comprising damage preventing means for preventing the joining faces of the liquid crystal displays from becoming damaged.

9. The portable display device of claim 5 further comprising extension securing means for maintaining the main body and the extension portion in the spread apart position.

10. The portable display device of claim 5 wherein each of the liquid crystal displays comprises an optical film formed thereover, the optical film comprising a plurality of micro convex lenses.

11. The portable display device of claim 4 wherein each of the displays are fixedly mounted in its respective one of the extension portion and the main body, the extension portion being spread apart from and then slid toward the main body to allow contact of the displays.

12. The portable display device of claim 11 wherein each of the displays comprises a liquid crystal display.

13. The portable display device of claim 4 wherein the means for inputting data comprises a light pen.

14. A portable display device comprising:
   a main body having means for inputting data and output data;
   an extension portion connected to the main body such that the extension portion can be folded over or spread apart from the main body;
   wherein each of said main body and said extension portion comprises a display for displaying the input data and the data output from the main body, at least one of the displays being capable of moving toward and contacting the other display, wherein each of the displays comprises a liquid crystal display with a side wall having a joining face where the liquid crystal displays come into contact with the other liquid crystal display, and
   damage preventing means for preventing the joining faces of the liquid crystal displays from becoming damaged, the damage preventing means comprising a resin film covering each of the joining faces of the liquid crystal displays, and a reinforcing layer provided over the resin film.

15. The portable display device of claim 14 wherein the resin film comprises insulative properties and is tinted black.

16. The portable display of claim 14 wherein the resin film comprises a thickness of 0.1 mm or less.

17. The portable display of claim 14 wherein the reinforcing layer comprises a thickness of 0.2 mm or less.

18. The portable display device of claim 14 wherein each of said displays is slidably mounted.

19. The portable display device of claim 18 wherein the resin film comprises insulative properties and is tinted black.

20. The portable display device of claim 18 wherein the resin film comprises insulative properties and is tinted black.

21. The portable display of claim 18 wherein the resin film comprises a thickness of 0.1 mm or less.

22. A portable display device comprising:
   a main body having means for inputting data and output data;
   an extension portion connected to the main body such that the extension portion can be folded over or spread apart from the main body; and
   wherein each of said main body and said extension portion comprises a liquid crystal display for displaying the input data and the data output from the main body, at least one of the displays being capable of moving toward and contacting the other display, and wherein each liquid crystal display comprises a side wall, a resin film adjacent to the side wall, and a reinforcing layer adjacent to the resin film where the displays contact each other, the liquid crystal displays forming a seam therebetween when in contact with each other, said seam having a width of 1.5 mm or less.

23. The portable display device of claim 22 wherein the side wall has a width of about 0.3 mm or less, the resin film has a width of about 0.1 mm or less, and the reinforcing layer has a width of 0.2 mm or less.

24. A portable display device comprising:

a main body having means for inputting data and output data;

an extension portion connected to the main body such that the extension portion can be folded over or spread apart from the main body; and extension securing means for maintaining the main body and the extension portion in the spread apart position, the extension securing means comprising
- a plurality of slots formed on a rear of the extension portion,
- a slide tab slidably provided in each of the slots, and
- a plurality of catch grooves formed in the main body corresponding to the position of the slide tabs when the extension portion and the main body are in the open state, each of the slide tabs being inserted into its respective catch groove; and wherein each of said main body and said extension portion comprises a liquid crystal display for displaying the input data and the data output from the main body, at least one of the displays being capable of moving toward and contacting the other display.

25. The portable display device of claim 24 wherein each of the displays is slidably mounted.

26. A portable display device comprising:

a main body having means for inputting data and output data;

an extension portion connected to the main body such that the extension portion can be folded over or spread apart from the main body;

wherein each of said main body and said extension portion comprises a display for displaying the input data and the data output from the main body, at least one of the displays being capable of moving toward and contacting the other display, and each of the displays is fixedly mounted in its respective one of the extension portion and the main body, the extension portion being spread apart from and then slid toward the main body to allow contact of the displays; and wherein the extension portion comprises indented corners each having a positioning rod, and the main body comprises a face corresponding to each of the indented corners of the extension portion, each of the faces having a vertical groove and a horizontal groove, each of the positioning rods being slideably provided in its respective horizontal groove when the liquid crystal displays are brought into contact, and provided in its respective vertical groove when folding the extension portion over the main body.

27. A portable display device comprising:

a main body comprising a display for displaying information; and an extension portion foldably coupled to the main body, the extension portion comprising a display for displaying information from the main body, wherein at least one of the displays is capable of moving toward and contacting the other display, and wherein at least one of the main body or the extension portion further comprises a data input circuit, such that the display and the data input circuit are in a single main body or extension portion housing.

28. The portable display device of claim 27 wherein the extension portion is hingedly coupled to the main body.

29. The portable display device of claim 27 wherein at least one of the displays is capable of slidably moving toward and contacting the other display.

30. The portable display device of claim 27 wherein the data input circuit comprises at least one data input key.

31. The portable display device of claim 27 wherein the data input circuit comprises a data input light pen.

* * * * *